United States Patent Office 3,317,467
Patented May 2, 1967

3,317,467
PROCESS FOR PREPARING POLYPHENOXYLENE COMPOSITIONS
Gordon P. Brown and Abraham Goldman, Schenectady, N.Y., assignors to General Electric Company, a corporation of New York
No Drawing. Filed Sept. 9, 1963, Ser. No. 307,365
10 Claims. (Cl. 260—47)

This invention relates generally to a process for preparing linear polyphenoxylene compositions and more particularly, to an improved process for preparing linear polyphenoxylene compositions consisting essentially of repeating units of an unsubstituted phenoxylene radical.

Polyphenoxylene homopolymers may be formed by condensing alkaline metal salts of p-halogenophenols in the presence of oxidation catalysts such as iodine as disclosed by D. H. Golden. Homopolymers may also be prepared by Ullman ether synthesis using an alkaline metal salt of an m-halogenophenol under anhydrous conditions as disclosed in the prior application of Gordon P. Brown and Roswell J. Blackinton, entitled, "Polyphenoxylene Compositions," Ser. No. 163,866, filed Jan. 2, 1962, and assigned to the assignee of the present invention. A solution polymerization of the monomer salt in a high boiling aromatic solvent is conducted according to both methods which yields solid polymers having insufficient molecular weight for general purpose application. On the other hand, bulk polymerization techniques are not advisable for the condensation due to the exothermic nature of the reaction with attendant formation of by-products and degraded polymer. Since the condensation must further be conducted under anhydrous conditions in order to take place effectively, usual technology associated with suspension and emulsion polymerization is not useful for improving the molecular weight of the polymerizate. Polymer yields by the specific methods above disclosed are also lower than desired. It would be an advantage to provide a polymerization process which provides polymers of increased molecular weight in higher yield than can be obtained readily by past practice. Likewise, it would be further advantageous if a polymerization process were provided which offered greater regulation of both polymer molecular weight and polymer yield.

It is one important object of the invention, therefore, to provide a process for preparing linear polyphenoxylene compositions of greater molecular weight in improved yield.

Still another important object of the invention is to provide a polymerization process for linear polyphenoxylene homopolymers wherein the molecular weight and polymer yield can be varied substantially during the process.

These and other important objects and advantages of the invention will be apparent from the following description illustrating preferred embodiments of the present process. Where parts and percentages are mentioned hereinafter in the specification and claims, reference is to parts and percentages by weight unless otherwise specified.

Briefly, the improved process of the invention comprises polymerizing an alkaline metal salt of a monohydric mono-halogenophenol in an inert nonpolar aliphatic hydrocarbon liquid which is essentially a nonsolvent for the reactants and the polyphenoxylene polymers and has a boiling point of at least 150° C. under anhydrous conditions in the presence of elemental copper as the catalyst for a period of time sufficient to provide the desired yield and molecular weight of polymer. Polymerization proceeds smoothly in the heterogeneous mixture of solid monomer salt suspended in the aliphatic hydrocarbon liquid at temperatures in the range 150–250° C. The violent exotherms experienced with conventional solution polymerization of the monomer salt in an aromatic solvent are no longer encountered at the mentioned conditions so that greater control may be exercised over the process from this result alone. Since polymers formed by the present process are not particularly soluble in the aliphatic liquid, the higher molecular weights may also be due to less cyclization than previously experienced with solution polymerization.

Polymer formation may also be achieved according to the invention by first reacting a mixture of a monohydric monohalogenophenol with an alkali metal hydroxide in organic liquid solvent to form the monomer salt followed by dehydration and suspension of the mixture directly in a nonpolar aliphatic hydrocarbon liquid for the condensation. In the modified process, the organic solvent selected for the monomer salt should have a boiling point substantially lower than the aliphatic hydrocarbon liquid employed to suspend the mixture for condensation to permit subsequent removal by distillation. Selective removal of the organic solvent by heating the suspension further requires use of a solvent which does not form an azeotrope with the aliphatic liquid at the polymerization conditions. Formation of the monomer salt in the manner above described may be conducted simply by heating the mixture at 70–95° C. for a short period.

In a different embodiment of the present process, a dispersant for the polyphenoxylene homopolymer is added to the heterogeneous reaction mixture for even further improvement in molecular weight and product yield. Increased dispersion of the polymer during preparation can be achieved with small but effective amounts of a high-boiling solvent for the reactants and/or the polyphenoxylene polymer or with particular surfactant additives. Specifically, the degree of polymerization is increased if the polymer is prevented from settling or agglomerating in the reaction mixture during substantially the entire period of condensation. Typical solvents possessing this ability at the present reaction conditions are liquid aromatic compounds such as phenyl ether, phenylcyclohexane, and benzophenone which have boiling points above about 200° C. and remain otherwise inert in the mixture. Useful surfactants must also remain chemically inert in the reaction media except for the desired dispersing action in order to achieve effective results. Suitable surfactants for the present polymerization system can be selected from the class of organic liquid soluble nonionic surfactants exhibiting primarily a dispersant nature as distinct from predominantly detergent, emulsifier, or wetting behavior. Perfluorocarbon surfactants such as "L1074" and "L1159," which are manufactured products of the Minnesota Mining and Manufacturing Company, have been found particularly effective.

Having described the invention generally, it may be practiced in its preferred embodiments as illustrated in the following examples. The examples describe preparation of polyphenoxylene homopolymers with meta, ortho, or para orientation of the phenoxylene group in the repeating unit. All homopolymer products may be characterized further by the absence of substituents other than the ether linkage on the phenyl group.

*Example 1*

A monomer salt for condensation according to the invention was prepared in a one liter 3-neck round bottom flask equipped with a thermometer, nitrogen inlet tube, stirrer, and reflux condenser fitted with a Dean-Stark trap. The flask was charged with approximately 500 milliliters of benzene, 0.5 gram-mole of m-bromophenol, 2 milliliters of distilled water, and 0.5 gram-mole of potassium hydroxide. Purification of the halogenophenol before use reduces the possibility of side reactions and of inhibiting the polymerization. Chromatographic processing of the halogenophenol on alumina followed by distillation of the product at reduced pressure provided an effectively purified reactant. The monomer salt was produced upon heating the reaction mixture to the reflux temperature, with continued heating for a period of approximately 3–4 hours being employed to dehydrate the mixture. Approximately 200 milliliters of a commercial eicosane liquid was then added in bulk to the reaction mixture along with 2.5 grams of powdered copper polymerization catalyst. The temperature of the reaction mixture was gradually raised to 180° C. with concurrent distillation of benzene. Polymerization was spontaneously initiated during this heating period and was continued for an additional 24 hours at 180° C. The polymerization was protected by blanketing the reaction mixture with a slow stream of nitrogen for the entire heating period. The homopolymer product was isolated by adding benzene to the reaction mixture followed by filtering to remove inorganic halide and copper, precipitating the polymer with methanol and freeze-drying a benzene solution of the polymer. A yield of approximately 82 percent polymer based on the weight of monomer salt was obtained by the described procedure.

The separated polymer was an amorphous solid having a softening point around 60° C. Examination of the polymer by conventional infrared spectroscopy revealed absorption peaks characteristic of an ether linkage at the meta position in the phenyl group together with an absence of any other ring substitution patterns. Molecular weight determination of the polymer by vapor pressure osmotic measurement indicated a value of 3300 which agreed closely with other determinations made by active hydrogen analysis and halogen analysis.

*Example 2*

Another meta-oriented polyphenoxylene homopolymer was prepared according to the invention in a different aliphatic liquid. Accordingly, approximately 0.25 mole of sodium m-chlorophenoxide was suspended in approximately 200 milliliters of a substantially straight chain liquid alkane hydrocarbon having a boiling point range of 358–498° C. at atmospheric pressure which is commercially available under the trade name "Nujol." Polymerization was initiated with the addition of approximately 2.5 grams powdered copper while heating the reaction mixture to approximately 180° C. with mechanical agitation. The condensation reaction was continued at 180° C. for approximately 72 hours in order to achieve the desired degree of polymerization. An amorphous solid product in 70 percent yield was separated from the reaction medium in the same manner previously described. The linear unsubstituted homopolymer obtained proved to be soluble in common organic liquids such as chloroform, benzene, xylene, toluene, and phenyl ether. Molecular weight determination of the product by vapor pressure osmotic measurement indicated a value of approximately 3800.

*Example 3*

If a dispersant is incorporated in the polymerization reaction medium, the molecular weight of the polymer product is increased substantially at otherwise comparable conditions of preparation. Thus, approximately 10 milliliters of phenyl ether added to the reaction mixture of Example 2 during polymerization resulted in a linear m-polyphenoxylene homopolymer having a molecular weight of approximately 7100 after approximately 60 hours of heating at 180° C. A polymer yield at the modified operating conditions was 60 percent based on the weight of monomer employed. When the aforementioned polymerization was conducted with a phenyl ether addition of 1 milliliter in the reaction mixture, a homopolymer exhibiting a molecular weight of approximately 8300 in 26 percent yield was obtained. These results indicate the profound influence of extremely small concentrations of the dispersing solvent in the present polymerization system.

*Example 4*

Substitution of a different dispersant in the heterogeneous reaction mixture has produced still further increase in the homopolymer molecular weight at the previously mentioned conditions of preparation. Accordingly, the addition of one milliliter of phenylcyclohexane to a suspension of 0.25 mole potassium chlorophenoxide in 200 milliliters Nujol containing 2.5 grams copper catalyst yielded a linear unsubstituted m-polyphenoxylene homopolymer having a molecular weight of approximately 10,000. The polymerization was otherwise conducted in the manner described for Example 2 at 180° C. for a period of 40 hours. The polymer yield at the described conditions was approximately 50 percent. A comparison of these results with values reported in the previous examples indicates advantageous reduction in the time required for polymerization with use of a dispersant.

*Example 5*

The noted improvements may also be demonstrated in the preparation of para-oriented polyphenoxylene homopolymers according to the invention. A molecular weight comparison between a homopolymer prepared in this manner and a solution polymerization product serves to indicate the advantages of the present method. A conventional polymerization was conducted by heating a solution of 0.25 gram-mole potassium p-bromophenoxide in 200 milliliters phenyl ether which contained 2.5 grams powdered copper at a reaction temperature of 150° C. for approximately 77 hours. The solid product obtained in approximately 4 percent yield proved soluble in phenyl ether. The polymer molecular weight determined by hydrogen end group analysis proved to be approximately 1700. For comparison, a heterogeneous polymerization was carried out with a suspension of 0.1 gram-mole of the same monomer salt in 50 milliliters "Nujol" liquid containing 1 gram powdered copper catalyst and 1 milliliter phenylcyclohexane dispersant for 24 hours at 180° C. The molecular weight of the soluble homopolymer was approximately 2500.

*Examples 6–9*

In a different embodiment of the present process, a nonionic surfactant disperses the polymer during preparation in the heterogeneous reaction mixture. The following examples all demonstrate the effectiveness of certain fluorocarbon surfactants in providing the novel dispersing action which increases the molecular weight and yield of polymer obtained. The particular surfactants employed are commercial products of the Minnesota Mining and Manufacturing Company sold under the tradenames listed in the table below reporting the individual polymerization results. For each of the reported examples, a polymerization reaction mixture comprising 0.25 gram-mole potassium m-chlorophenol, 200 milliliters "Nujol" aliphatic liquid, 2.5 grams copper catalyst, and the amount of particular surfactant noted was heated at 180–185° C. for a period of 24 hours. Separation of the polymer product from the reaction mixture and determination of the polymerization results reported were achieved in the same general manner previously indicated.

TABLE

| Example | Surfactant | Surfactant Amount (gram) | Polymer Molecular Weight | Yield (percent) |
|---|---|---|---|---|
| 6 | L1074 | 0.1 | 6,900 | 65 |
| 7 | L1159 | 0.1 | 8,700 | 24 |
| 8 | L1074 | 1.0 | 6,400 | 71 |
| 9 | L1159 | 1.0 | 6,900 | 40 |

The above results indicate the same general improvement provided by incorporation of polymer solvents in the reaction mixture.

*Example 10*

Still another embodiment of the present process may be illustrated in the preparation of ortho-oriented polyphenoxylene homopolymers. Accordingly, 0.2 gram-mole potassium o-chlorophenoxide was suspended in 100 milliliters of "Nujol" aliphatic liquid containing 1 gram copper catalyst. The reaction mixture was heated at 180° C. for a period of 24 hours to achieve the desired degree of polymerization. An amorphous solid product having a softening point of approximately 175° C. was separated from the reaction mixture in the usual fashion. The polymer proved soluble in phenyl ether. Spectroscopic examination of the polymeric composition yielded peaks at the regions for ortho-orientation of an ether linkage on the phenyl group in a pattern characteristic of the linear homopolymer.

From the foregoing description, it will be apparent that a novel method for preparation of a polyphenoxylene homopolymer has been provided. It is further apparent that the present method provides more effective control over both yield and molecular weight of the polymer product than is now possible with conventional techniques. The general method is considered broadly useful for preparation of still other related polymers within the general class of polyphenoxylene condensation products including copolymers and branch polymers having repeating aromatic linkages. It will be obvious to those skilled in the art, therefore, that certain modifications of the present embodiments can be made without departing from the true spirit and scope of the invention. For example, it is possible to condense mixtures containing alkali metal salts of two or more different monohydric halogenophenols suspended in the aliphatic liquid to provide a copolymer product. It is intended to limit the present invention, therefore, only to the scope of the following claims.

What we claim as new and desire to secure by Letters Patent of the United States is:

1. A process for the preparation of a solid linear polyphenoxylene composition which comprises heating a suspension of the alkali metal salt of a monohydric monohalogenophenol which is free of substituents other than the phenolic hydroxyl and halogen, in an inert nonpolar aliphatic hydrocarbon liquid in which said salt of the monohalogenophenol and polyphenoxylene composition are essentially insoluble throughout the reaction and has a boiling point of at least 150° C., under anhydrous conditions in the presence of elemental copper catalyst for a period of time sufficient to achieve polymerization.

2. A process for the preparation of a solid linear polyphenoxylene composition which comprises heating a suspension of the alkali metal salt of a monohydric monohalogenophenol which is free of substituents other than the phenolic hydroxyl and halogen, in an inert nonpolar aliphatic hydrocarbon liquid in which said salt of the monohalogenophenol and polyphenoxylene composition are essentially insoluble throughout the reaction, has a boiling point of at least 150° C. and contains a dispersant for the polyphenoxylene composition, under anhydrous conditions in the presence of elemental copper catalyst for a period of time sufficient to achieve polymerization.

3. A process for the preparation of a solid linear polyphenoxylene composition which comprises suspending an anhydrous alkali metal salt of a monohydric monohalogenophenol which is free of substituents other than the phenolic hydroxyl and halogen, and an organic solvent in a nonpolar aliphatic hydrocarbon liquid in which said salt of the monohalogenophenol and polyphenoxylene composition are essentially insoluble throughout the reaction and has a boiling point of at least 150° C. and higher than the organic solvent, heating the suspension under anhydrous conditions in the presence of elemental copper catalyst at a sufficiently elevated temperature to remove the organic solvent, and maintaining the elevated temperature for a period of time sufficient to achieve polymerization.

4. A process for the preparation of a solid linear polyphenoxylene composition which comprises suspending an anhydrous alkali metal salt of a monohydric monohalogenophenol which is free of substituents other than the phenolic hydroxyl and halogen, and an organic solvent in a nonpolar aliphatic hydrocarbon liquid in which said salt of the monohalogenophenol and polyphenoxylene composition are essentially insoluble throughout the reaction and has a boiling point of at least 150° C. and higher than the organic solvent, the nonpolar aliphatic hydrocarbon containing a dispersant for the polyphenoxylene composition, heating the suspension under anhydrous conditions in the presence of elemental copper catalyst at a sufficiently elevated temperature to remove the organic solvent, and maintaining the elevated temperature for a period of time sufficient to achieve polymerization.

5. A process for the preparation of a solid linear polyphenoxylene composition which comprises suspending an anhydrous alkali metal salt of a monohydric monohalogenophenol which is free of substituents other than the phenolic hydroxyl and halogen, and an organic solvent in a nonpolar aliphatic hydrocarbon liquid in which said salt of the monohalogenophenol and polyphenoxylene composition are essentially insoluble throughout the reaction and has a boiling point of at least 150° C. and higher than the organic solvent, heating the suspension under anhydrous conditions at a sufficiently elevated temperature to remove the organic solvent, adding elemental copper catalyst and a dispersant for the polyphenoxylene composition to the suspension, and maintaining the elevated temperature for a period of time sufficient to achieve polymerization.

6. A process for the preparation of a solid linear polyphenoxylene composition which comprises reacting a mixture of a monohydric monohalogenophenol which is free of substituents other than the phenolic hydroxyl and halogen, with an alkali metal hydroxide to form the alkali metal salt of the monohydric monohalogenophenol, dissolving the salt in an organic liquid solvent, suspending the dissolved salt in a nonpolar aliphatic hydrocarbon liquid in which said salt of the monohalogenophenol and polyphenoxylene composition are essentially insoluble throughout the reaction and has a boiling point of at least 150° C. and higher that the organic solvent, heating the suspension under anhydrous conditions in the presence of elemental copper catlayst at a sufficiently elevated temperature to remove the organic solvent, and maintaining the elevated temperature for a period of time sufficient to achieve polymerization.

7. A process for the preparation of a solid linear polyphenoxylene composition which comprises reacting a mixture of a monohydric monohalogenophenol which is free of substituents other than the phenolic hydroxyl and halogen, with an alkali metal hydroxide in an organic liquid solvent to form the alkali metal salt of the monohydric monohalogenophenol in solution, removing water from the solution, suspending the anhydrous solution in a nonpolar aliphatic hydrocarbon liquid in which the said salt of the monohalogenophenol and polyphenoxylene composition are essentially insoluble throughout the reaction and has a boiling point of at least 150° C. and higher than the organic solvent, heating the suspension under anhydrous conditions in the presence of a elemental copper catalyst at a sufficiently elevated temperature to remove the organic solvent, and maintaining the elevated temperature for a period of time sufficient to achieve polymerization.

8. A process for the preparation of a solid linear polyphenoxylene composition which comprises reacting a mixture of a monohydric monohalogenophenol which is free of substituents other than the phenolic hydroxyl and halogen, with an alkali metal hydroxide to form the alkali metal salt of the monohydric monohalogenophenol, dissolving the salt in an organic liquid solvent, suspending the dissolved salt in a nonpolar aliphatic hydrocarbon liquid in which said salt of the monohalogenophenol and polyphenoxylene composition are essentially insoluble throughout the reaction and which has a boiling point of at least 150° C. and higher than the organic solvent, the nonpolar aliphatic hydrocarbon liquid containing a dispersant for the polyphenoxylene composition, heating the suspension under anhydrous conditions in the presence of elemental copper catalyst at a sufficiently elevated temperature to remove the organic solvent, and maintaining the elevated temperature for a period of time sufficient to achieve polymerization.

9. A process for the preparation of a linear polyphenoxylene composition which comprises reacting a mixture of a monohydric monohalogenophenol which is free of substituents other than the phenolic hydroxyl and halogen, with an alkali metal hydroxide in an organic liquid solvent to form the alkali metal salt of the monohydric monohalogenophenol in solution, removing water from the solution, suspending the anhydrous solution in a nonpolar aliphatic hydrocarbon liquid in which said salt of the monohalogenophenol and polyphenoxylene composition are essentially insoluble throughout the reaction and which has a boiling point of at least 150° C. and higher than the organic solvent, the nonpolar aliphatic hydrocarbon liquid containing a dispersant for the polyphenoxylene composition, heating the suspension under anhydrous conditions in the presence of elemental copper catalyst at a sufficiently elevated temperature to remove the organic solvent, and maintaining the elevated temperature for a period of time sufficient to achieve polymerization.

10. A process for the preparation of a linear polyphenoxylene composition which comprises reacting a mixture of a monohydric monohalogenophenol which is free of substituents other than the phenolic hydroxyl and halogen, with an alkali metal hydroxide in an organic liquid solvent to form the alkali metal salt of the monohydric monohalogenophenol in solution, removing water from the solution, suspending the anhydrous solution in a nonpolar aliphatic hydrocarbon liquid in which said salt solvent of the monohalogenophenol and the polyphenoxylene composition are essentially insoluble throughout the reaction and which has a boiling point of at least 150° C. and higher than the organic solvent, heating the suspension under anhydrous conditions at a sufficiently elevated temperature to remove the organic solvent, adding elemental copper catalyst and a dispersant for the polyphenoxylene composition to the suspension, and maintaining the elevated temperature for a period of time sufficient to achieve polymerization.

References Cited by the Examiner

UNITED STATES PATENTS

| | | | |
|---|---|---|---|
| 3,236,807 | 2/1966 | Stamatoff | 260—47 |
| 3,257,357 | 6/1966 | Stamatoff | 260—47 |

WILLIAM H. SHORT, *Primary Examiner.*

SAMUEL H. BLECH, *Examiner.*

J. C. MARTIN, M. GOLDSTEIN, *Assistant Examiners.*